United States Patent
Shimoda

(10) Patent No.: US 6,381,202 B1
(45) Date of Patent: Apr. 30, 2002

(54) INFORMATION RECORDING/REPRODUCING APPARATUS AND INFORMATION RECORDING METHOD

(75) Inventor: Yasuhisa Shimoda, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/695,424

(22) Filed: Oct. 25, 2000

(30) Foreign Application Priority Data

Dec. 22, 1999 (JP) .......................................... 11-364215

(51) Int. Cl.⁷ ................................................ G11B 7/00
(52) U.S. Cl. .................. 369/47.1; 369/47.32; 369/59.1; 369/60.01
(58) Field of Search .............................. 369/47.1, 47.11, 369/47.15, 47.28, 47.32, 53.1, 53.11, 53.41, 59.1, 60.01

(56) References Cited

U.S. PATENT DOCUMENTS 5,706,266 A * 1/1998 Brownstein et al. ...... 369/53.21
6,137,751 A * 10/2000 Kim ............................ 369/32

* cited by examiner

*Primary Examiner*—Muhammad Edun
(74) *Attorney, Agent, or Firm*—Morgan, Lewis & Bockius LLP

(57) ABSTRACT

An information recording/reproducing apparatus and an information recording method which allow the formation of a recording pit having a preferable shape. One of a first recording standard and a second recording standard is selected based on a common disc type recorded in a recording disc and a disc type obtained on the basis of predetermined information recorded in the recording disc. A recording signal having a recording waveform according to the selected recording standard is generated.

15 Claims, 6 Drawing Sheets

| COMMON DISC TYPE | | 1ST RECORDING STANDARD INFO D3 | | |
|---|---|---|---|---|
| MEDIA TYPE | β CATEGORY | ΔPD | ΔPH | θT |
| A | LOW | 1.5 · T | 0.2 · Pw | 0.75 · T |
| A | HIGH | 1.0 · T | 0.1 · Pw | 1.00 · T |
| B | LOW | 1.5 · T | 0.2 · Pw | 0.25 · T |
| B | HIGH | 1.0 · T | 0.2 · Pw | 0.50 · T |
| C | LOW | 1.0 · T | 0.3 · Pw | 0.50 · T |
| C | HIGH | 1.5 · T | 0.3 · Pw | 0.25 · T |

FIG. 5

| LEAD-IN START TIME | TYPE CODE | MANUFACTURER CODE INFO D1 |
|---|---|---|
| 97m23s50f~97m23s54f | LONG | a01 |
| 97m23s55f~97m23s59f | SHORT | |
| 97m23s30f~97m23s34f | LONG | b01 |
| 97m23s35f~97m23s39f | SHORT | |
| 97m23s40f~97m23s44f | LONG | c01 |
| 97m23s45f~97m23s49f | SHORT | |
| 97m23s60f~97m23s64f | LONG | d01 |
| 97m23s65f~97m23s69f | SHORT | |

FIG. 6

| MANUFACTURER CODE | TYPE CODE | DEDICATED DISC TYPE INFO D2 | |
|---|---|---|---|
| | | MEDIA TYPE | β CATEGORY |
| a01 | LONG | A | LOW |
| | SHORT | B | HIGH |
| b01 | LONG | B | HIGH |
| | SHORT | C | HIGH |
| c01 | LONG | C | LOW |
| | SHORT | B | HIGH |
| d01 | LONG | A | LOW |
| | SHORT | C | HIGH |

FIG. 7

| MANUFACTURER CODE | TYPE CODE | 2ND RECORDING STANDARD INFO D4 | | |
|---|---|---|---|---|
| | | $\Delta P_D$ | $\Delta P_H$ | $\theta T$ |
| a01 | LONG | $1.5 \cdot T$ | $0.15 \cdot P_w$ | $1.00 \cdot T$ |
| | SHORT | $0.5 \cdot T$ | $0.10 \cdot P_w$ | $0.75 \cdot T$ |
| b01 | LONG | $1.0 \cdot T$ | $0.20 \cdot P_w$ | $1.00 \cdot T$ |
| | SHORT | $1.5 \cdot T$ | $0.10 \cdot P_w$ | $1.00 \cdot T$ |
| c01 | LONG | $0.5 \cdot T$ | $0.15 \cdot P_w$ | $0.50 \cdot T$ |
| | SHORT | $1.0 \cdot T$ | $0.15 \cdot P_w$ | $1.00 \cdot T$ |
| d01 | LONG | $1.5 \cdot T$ | $0.20 \cdot P_w$ | $1.00 \cdot T$ |
| | SHORT | $0.5 \cdot T$ | $0.10 \cdot P_w$ | $0.75 \cdot T$ |

FIG. 8

| TYPE CODE | 3RD RECORDING STANDARD INFO D5 | | |
|---|---|---|---|
| | $\Delta P_D$ | $\Delta P_H$ | $\theta T$ |
| LONG | $1.5 \cdot T$ | $0.2 \cdot P_w$ | $1.0 \cdot T$ |
| SHORT | $0.5 \cdot T$ | $0.1 \cdot P_w$ | $0.5 \cdot T$ |

INFORMATION RECORDING/REPRODUCING APPARATUS AND INFORMATION RECORDING METHOD

BACKGROUND OF THE INVENTION

1. Field of the Invention

The invention relates to an information recording/reproducing apparatus for recording information data on a recording medium.

2. Description of Related Art

As a type of optical recording medium which allows writing of information data thereon, attention is drawn to such recording discs as WORM (Write Once Read Many)-type CD (Compact Disc)-R, DVD (Digital Versatile Disc)-R, a rewritable DVD-RW, or the like.

In an information recording apparatus, for example the following processes are executed when writing information data to the recording disc.

First, a recording signal having a level change according to the information data is formed, and supplied to a writing laser diode. The writing laser diode generates a laser beam having a light power according to the level of the recording signal and irradiates the generated laser beam on the recording surface of the recording disc. As a result of the irradiation, the reflectance of an area irradiated by the laser beam is reduced as compared with that of an area where the laser beam is not irradiated. The area of the reduced reflectance becomes a recording pit indicative of the information data.

However, a variation in shape of the recording pits occurs, which variation is formed by the irradiation of the laser beam in dependence on differences in structure, material, and the like of the recording disc.

According to the standard of the CD-R as a WORM-type recording disc, i.e., what is called Orange Book, it is specified that the CD-R is classified into six kinds of disc types (hereinafter, referred to as a common disc type) based on a combination with a media type (types A to C) and a β category (high, low) as shown in FIG. 1 and used in common by manufacturers.

For example, at a manufacturer of the CD-R, information data is at first recorded to the CD-R, that is manufactured by the devices owned by the manufacturer, by using a standard recording apparatus which can record information to any of the six kinds of CD-R, and discrimination is made, based on a result of the recording, as to which one of the six kinds of common disc types the CD-R belongs. The manufacturer of the CD-R then records the common disc type (media type=β category) obtained by the discrimination result to the CD-R and ships the CD-Rs on which the common disc type is recorded.

On the side of a recording apparatus for recording the information data to the shipped CD-R, waveform parameters ($\Delta P_D$, $\Delta P_H$, $\ominus T$) based on the first recording standard as a strategy for generating the optimum recording signal as shown in FIG. 1 are set in correspondence to each of the six kinds of common disc types. According to the first recording standard, a 3T-EFM (Eight to Fourteen Modulation) modulation signal as shown, for example, in the part (a) of FIG. 2 indicative of an information data signal is converted into a recording signal having a waveform as shown in the part (b) of FIG. 2. As shown in the part (b) of FIG. 2, the recording signal waveform first rises or increases with a delay of time $\ominus T$ from a leading edge of the EFM modulation signal. A recording power which is higher than a recording power $P_W$ by $\Delta P_H$ is maintained for a period of time of $\Delta P_D$ and, after that, is held to a level of the recording power $P_W$ until a trailing edge of the EFM modulation signal. That is, on the recording apparatus side, the common disc type is read out from the loaded CD-R, a recording signal having a waveform according to the recording standard corresponding to the common disc type is generated, and the laser diode for writing is driven, thereby providing a formation of a recording pit having a preferable shape.

That is, according to the Orange Book, the manufacturing source is promoted so as to manufacture the CD-R corresponding to one of the six kinds of common disc types.

In the case of some of the manufacturing companies of the CD-R, however, although the manufactured CD-R is allowed to correspond to the six kinds of common disc types, there is a case that some companies manufacture CD-Rs for which the common disc type is not always suited best.

OBJECTS AND SUMMARY OF THE INVENTION

The invention is made to solve the above problem and it is an object of the invention to provide an information recording/reproducing apparatus and an information recording method which can form a recording pit having a more preferable shape.

According to an aspect of the invention, there is provided an information recording/reproducing apparatus for recording information to a recording disc by irradiating a recording beam light to the recording disc according to a recording signal indicative of information data, comprising: memory means in which common disc type information to be recorded in the recording disc and a first recording standard showing waveform parameters at the time when the recording signal is generated have been stored in correspondence to each other and predetermined information to be recorded in the recording disc and a second recording standard showing waveform parameters at the time when the recording signal is generated have been stored in correspondence to each other; means for reading out the common disc type information and the predetermined information from the recording disc, respectively; and recording signal generating means for selecting one of the first recording standard and the second recording standard on the basis of the common disc type information and the predetermined information, reading out the selected standard from the memory means, and generating the recording signal on the basis of the read-out recording standard.

According to another preferred aspect of the invention, there is provided an information recording method of recording information to a recording disc by irradiating a recording beam light according to a recording signal indicative of information data to the recording disc, comprising the steps of: storing common disc type information to be recorded in the recording disc and a first recording standard showing waveform parameters at the time when the recording signal is generated into memory means in correspondence to each other and further storing predetermined information to be recorded in the recording disc and a second recording standard showing waveform parameters at the time when the recording signal is generated into the memory means in correspondence to each other, respectively; and selecting one of the first recording standard and the second recording standard on the basis of the common disc type information read out from the recording disc and the predetermined information, reading out the selected standard from the memory means, and generating the recording signal on the basis of the read-out recording standard.

BRIEF DESCRIPTION OF THE DRAWINGS

FIG. 5 is a diagram showing an example of manufacturer code information stored in the ROM 34;

FIG. 6 is a diagram showing an example of dedicated disc type information stored in the ROM 34;

FIG. 7 is a diagram showing an example of second recording standard information stored in the ROM 34;

FIG. 8 is a diagram showing an example of third recording standard information stored in the ROM 34.

DETAILED DESCRIPTION OF THE PREFERRED EMBODIMENTS

Figure 3:
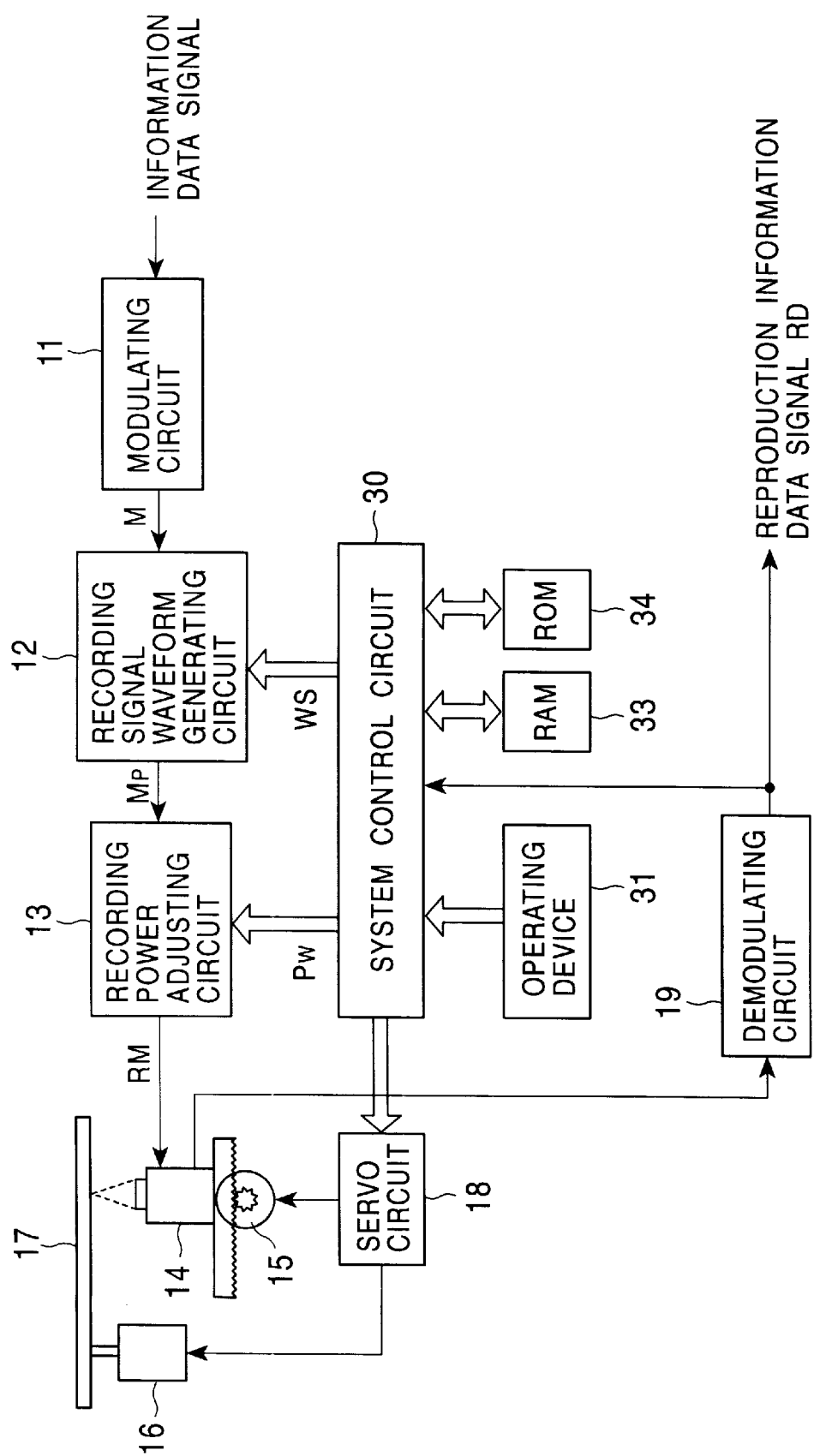
FIG. 3 is a diagram showing a construction of an information recording/reproducing apparatus according to the invention.

FIG. 3 is a diagram showing construction of an information recording/reproducing apparatus according to the invention.

In FIG. 3, a recording modulating circuit 11 performs a predetermined modulating process for recording to an information data signal such as video signal, audio signal, or computer data signal and supplies a modulation signal M obtained in this process to a recording signal waveform generating circuit 12. The recording signal waveform generating circuit 12 converts the modulation signal M into a waveform according to a recording standard signal WS supplied from a system control circuit 30 and supplies it to a recording power adjusting circuit 13. The recording power adjusting circuit 13 shifts a level of an amplitude of an output signal $M_P$ of the generating circuit 12 to a value according to the recording power designation signal $P_W$ supplied from the system control circuit 30 and supplies the resultant amplitude as a recording signal RM to a recording/reproducing head 14. A slider mechanism 15 moves the recording/reproducing head 14 in the radial direction of a recording disc 17 which is rotated by a spindle motor 16. A servo circuit 18 generates a driving voltage for driving each of the slider mechanism 15 and spindle motor 16 by an amount corresponding to various servo control signals supplied from the system control circuit 30 and supplies it to each of the slider mechanism 15 and spindle motor 16.

The recording disc 17 is a WORM-type optical recording medium such as a CD-R which is divided into: a program area in which information data is recorded; and a management area in which various management information has been recorded which is used when the recording/reproducing operations to/from the recording disc 17 are executed. In addition to a lead-in time showing an information reading start position specified by every disc manufacturer, a media type and p category information of the recording disc 17 have also been previously recorded as management information in the management area.

In response to an information recording start command signal supplied from the system control circuit 30, a laser diode (not shown) mounted on the recording/reproducing head 14 generates a recording beam light having a light power according to a level change of the recording signal RM and irradiates it onto the recording surface of the recording disc 17. By the irradiation of the recording beam light, a recording pit having a pit length corresponding to the modulation signal M is formed on the recording surface of the recording disc 17. When the information reading start command signal is supplied from the system control circuit 30, the laser diode irradiates a reading beam light onto the recording surface of the recording disc 17. In this state, an information reading optical system (not shown) mounted on the recording/reproducing head 14 receives the reflection light from the recording disc 17 and guides it to a photodetector (not shown). The photodetector photoelectrically converts the reflection light, thereby obtaining a read signal corresponding to the recording information recorded on the recording disc 20 and supplying it to a demodulating circuit 19.

The demodulating circuit 19 binarizes the read signal supplied from the recording/reproducing head 14 and, thereafter, reconstructs the information data signal by performing a predetermined demodulating process, and generates it as reproduction information data signal RD.

An operating device 31 which accepts various instructing operations by the user, an RAM (Random Access Memory) 33, and an ROM (Read Only Memory) 34 are connected to the system control circuit 30.

Figure 4:
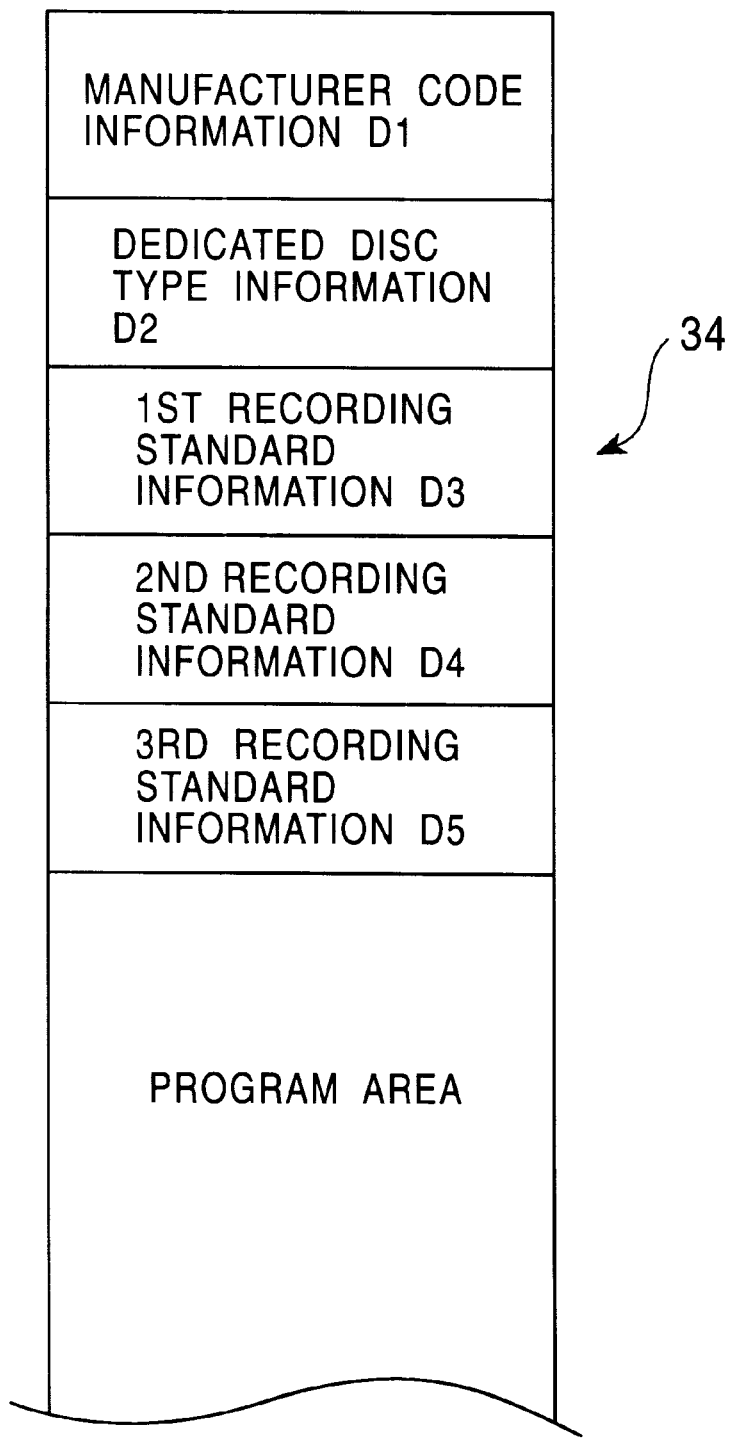
FIG. 4 is a diagram showing a schematic memory map in an ROM 34.

FIG. 4 is a diagram showing a schematic memory map in the ROM 34.

Figures 1, 2:
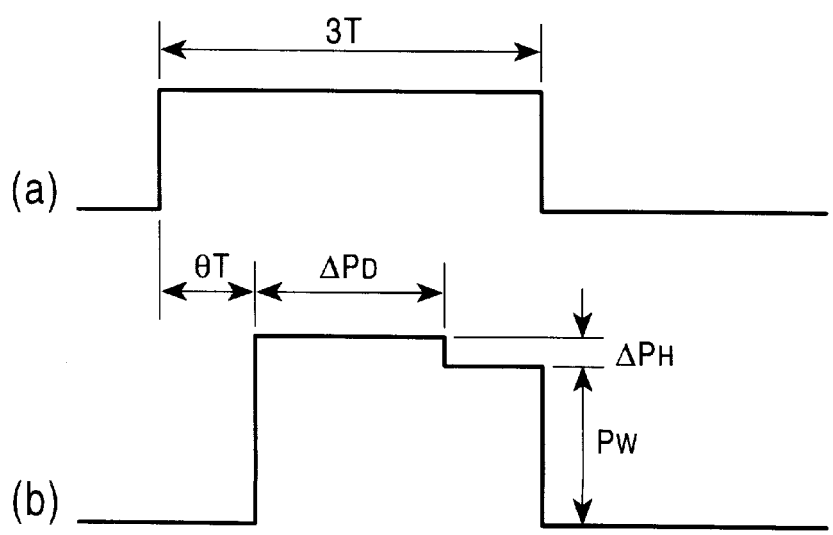
FIG. 1 is a diagram showing an example of first recording standard information in which a media type and a β category of a recording disc and waveform parameters ($\Delta P_D$, $\Delta P_H$, $\ominus T$) based on the first recording standard have been made to correspond to each other.
FIG. 2 is a diagram showing waveforms of a recording signal based on the waveform parameters ($\Delta P_D$, $\Delta P_H$, $\ominus T$) based on the recording standard.

As shown in FIG. 4, manufacturer code information D1 as shown in FIG. 5, dedicated disc type information D2 per manufacturer as shown in FIG. 6, first recording standard information D3 as shown in FIG. 1, second recording standard information D4 as shown in FIG. 7, and third recording standard information D5 as shown in FIG. 8 have previously been registered in the ROM 34, respectively.

As shown in FIG. 5, a "lead-in start time" indicative of a reading start position on the recording disc, a "manufacturer code" showing each manufacturer, and a "type code" are described in correspondence to each other in the manufacturer code information D1. The type code denotes disc type information representing disc types where the recording discs are classified into two kinds of disc types according to recording characteristics. As those two kinds of disc types, there is a long type in which a long recording signal waveform is necessary because a pit forming response speed for the recording beam is low and a short type in which a short recording signal waveform is necessary because a pit forming response speed for the recording beam is high.

As shown in FIG. 6, the combinations of the manufacturer code and the type code and various disc types (media type+β category) have been described in the dedicated disc type information D2 in correspondence to each other. That is, at a time point when the second recording standard information has been determined, common disc type information which is recorded to the recording disc by the manufacturer of the recording disc has been registered as dedicated disc type information.

As shown in FIG. 1, each of the six kinds of common disc types defined by the Orange Book and the waveform parameters ($\Delta P_D$, $\Delta P_H$, $\ominus T$) based on the first recording standard are described in the first recording standard information D3 in correspondence to each other.

As shown in FIG. 7, the combinations of the manufacturer code and the type code and the waveform parameters ($\Delta P_D$, $\Delta P_H$, $\ominus T$) based on the second recording standard which are optimum to each of those combinations have been described in the second recording standard information D4 in correspondence to each other. That is, the waveform parameters ($\Delta P_D$, $\Delta P_H$, $\ominus T$) based on the recording standard which can generate the optimum recording signal for each recording disc of each manufacturer have been registered.

As shown in FIG. 8, the waveform parameters ($\Delta P_D$, $\Delta P_H$, $\ominus T$) based on the optimum third recording standard have been described in the third recording standard information D5 for every type code in correspondence to each other. That is, the waveform parameters ($\Delta P_D$, $\Delta P_H$, $\ominus T$) based on the recording standard which can be used in each case where the recording disc is of the long type and where it is of the short type are registered.

As shown in FIG. 4, further, software to perform the operation of the information signal recording/reproducing apparatus itself has previously been stored in the program area in the ROM 34.

The control operation of the information signal recording/reproducing apparatus which is executed by the system control circuit 30 in accordance with the software will be described below.

First, when the user operates the operating device 31 to record the information data to the recording disc 17, the operating device 31 sends a recording command signal to the system control circuit 30. In response to the recording command signal, the system control circuit 30 temporarily stops the execution of a main control flow (not described) based on the software and starts the execution of a recording initial setting subroutine as shown in FIG. 9.

Figure 9:
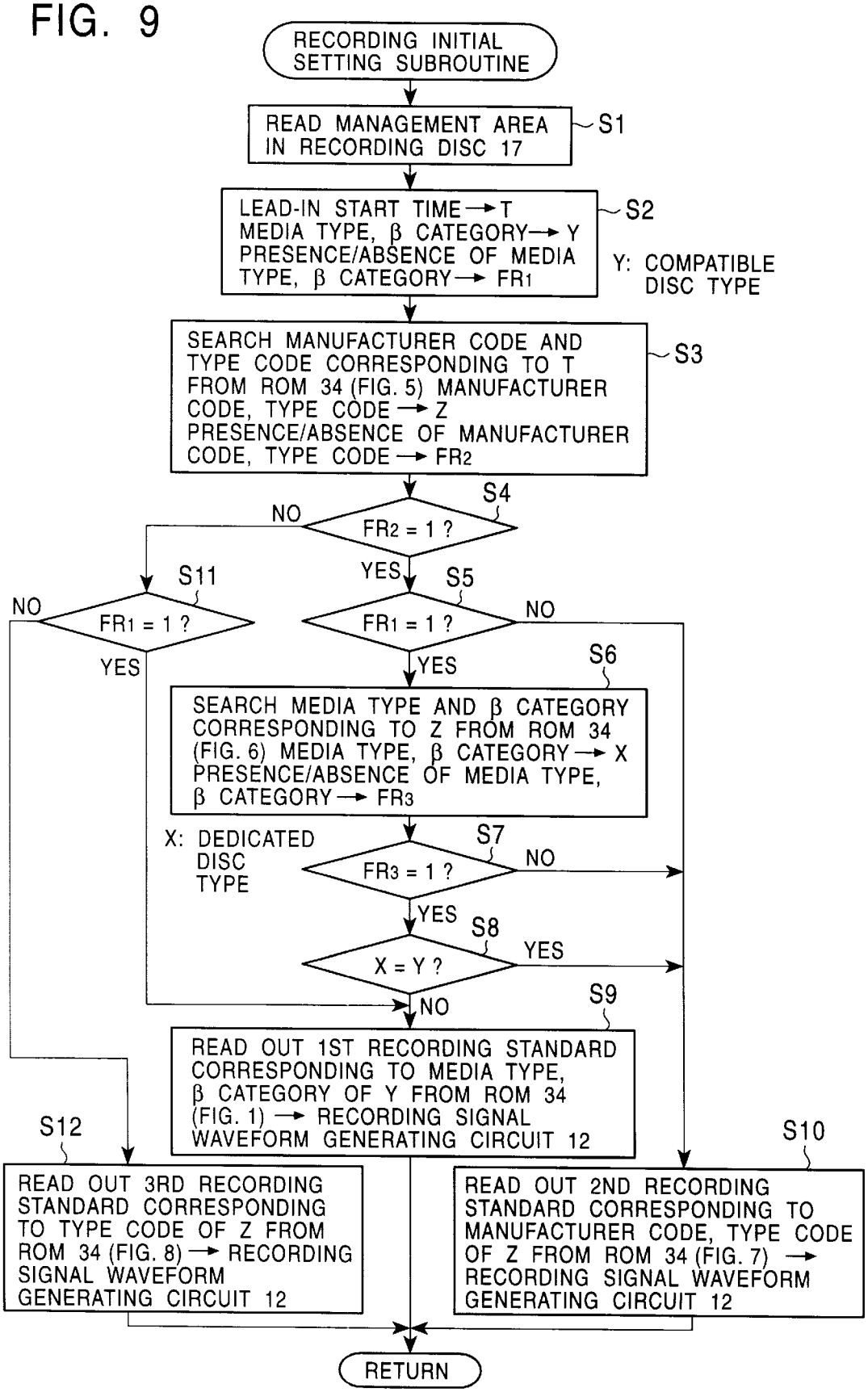
FIG. 9 is a diagram showing a recording initial setting subroutine based on an information recording method of the invention.

In FIG. 9, first, the system control circuit 30 supplies a slider servo control signal for moving the recording/reproducing head 14 to the servo circuit 18 in order to read the recording information from the management area on the recording disc 17 and supplies an information reading start command signal to the recording/reproducing head 14 (step S1). In response to the signal, the recording/reproducing head 14 is moved to the management area on the recording disc 17 and starts the reading of the recording information from this position. In this instance, the demodulating circuit 19 sends the reproduction information data signal RD corresponding to the reading from the management area to the system control circuit 30.

The system control circuit 30 subsequently extracts lead-in start time information from the reproduction information data signal RD and stores it into a built-in register T (not shown). Further, the media type and β category information are searched from the reproduction information data signal RD. A flag, which is set to the logic level "1" when the media type and β category information can be searched and is set to the logic level "0" when the media type and β category information cannot be searched, is written into a first flag register $FR_1$ (not shown). In this instance, when the media type and β category information can be searched, the system control circuit 30 stores the media type and β category information into a built-in register Y (not shown) (step S2).

Subsequently, the system control circuit 30 searches the manufacturer code and type code corresponding to the lead-in start time information stored in the built-in register T from the manufacturer code information registered in the ROM 34 as shown in FIG. 5. In this instance, a flag, which is set to the logic level "1" when the manufacturer code and type code corresponding to the lead-in start time information can be searched and is set to the logic level "0" when the manufacturer code and type code corresponding to the lead-in start time cannot be searched is written into a second flag register $FR_2$ (not shown). When the manufacturer code and type code can be searched, the system control circuit 30 stores each of the manufacturer code and type code into a built-in register Z (not shown) (step S3).

Subsequently, the system control circuit 30 discriminates whether the contents in the second flag register $FR_2$ indicate the logic level "1" or not, namely, whether the manufacturer code and type code corresponding to the lead-in start time information on the recording disc 17 exist in the manufacturer code information registered in the ROM 34 or not (step S4). If it is determined in step S4 that the contents in the second flag register $FR_2$ indicate the logic level "1", namely, the manufacturer code and type code corresponding to the lead-in start time information on the recording disc 17 exist in the manufacturer code information registered in the ROM 34, the system control circuit 30 executes the next step S5. In step S5, the system control circuit 30 discriminates whether the contents in the first flag register $FR_1$ indicate the logic level "1" or not, namely, whether the media type and the P category information as shown in FIG. 1 have been recorded on the recording disc 17 or not (step S5). If it is determined in step S5 that the contents in the first flag register FR, indicate the logic level "1", namely, the media type and the β category information have been recorded on the recording disc 17, the system control circuit 30 executes the next step S6. In step S6, the system control circuit 30 searches the dedicated disc type (media type+β category) corresponding to the manufacturer code and type code stored in the built-in register Z from the dedicated disc type information per manufacturer registered in the ROM 34 as shown in FIG. 6. At this time, a flag which is set to the logic level "1" when the dedicated disc type corresponding to the manufacturer code and type code can be searched and is set to the logic level "0" when it cannot be searched is written into a third flag register $FR_3$ (not shown). Further, when the dedicated disc type (media type+β category) can be searched, the system control circuit 30 stores the media type and the β category into a built-in register X (not shown) (step S6).

Subsequently, the system control circuit 30 discriminates whether the contents in the third flag register $FR_3$ indicate the logic level "1" or not (step S7). That is, the system control circuit 30 discriminates whether or not the dedicated disc type (media type+β category) corresponding to the manufacturer code and type code of the recording disc 17 exist in the dedicated disc type information per manufacturer registered in the ROM 34 as shown in FIG. 6. If it is determined in step S7 that the contents in the third flag register $FR_3$ is set to the logic level "1", namely, that the dedicated disc type (media type+β category) corresponding to the manufacturer code and type code of the recording disc 17 exist, the system control circuit 30 executes the next step S8. In step S8, the system control circuit 30 discriminates whether the contents stored in the built-in registers X and Y coincide or not, namely, whether the common disc type (media type+β category) recorded on the recording disc 17 and the dedicated disc type (media type+β category) read out from the ROM 34 coincide or not (step S8). When it is determined in step S8 that the common disc type (media type+β category) and the dedicated disc type (media type and β category) do not coincide, the system control circuit 30 reads out the waveform parameters ($\Delta P_D$, $\Delta P_H$, $\ominus T$) based on the first recording standard corresponding to the common disc type (media type+β category) stored in the built-in register Y from the first recording standard information registered in the ROM 34 as shown in FIG. 1 and supplies the read-out waveform parameters ($\Delta P_D$, $\Delta P_H$, $\ominus T$) as a recording standard signal WS as mentioned above to the recording signal waveform generating circuit 12 (step S9). In response to the execution of step S9, the recording signal waveform generating circuit 12 generates a recording signal of a waveform based on the waveform parameters ($\Delta P_D$, $\Delta P_H$, $\ominus T$) according to the first recording standard corresponding to the common disc type (media type+β category) recorded on the recording disc 17.

That is, when the common disc type recorded on the recording disc 17 and the dedicated disc type read out from the ROM 34 are different, it is determined that the recording disc is a recording disc having recording characteristics which are not standardized yet at a time when the second recording standard has been defined. The waveform parameters ($\Delta P_D$, $\Delta P_H$, $\ominus T$) according to the first recording standard corresponding to the common disc type recorded on the recording disc 17 are read out from the first recording standard information registered in the ROM 34, thereby performing the setting of the recording signal waveform generating circuit 12.

If it is determined in steps S5 or S7 that the contents in the first flag register $FR_1$ or third flag register $FR_3$ do not indicate the logic level "1" or if it is decided in step S8 that the contents stored in the built-in registers X and Y coincide, the system control circuit 30 executes next step S10. In step S10, the system control circuit 30 reads out the waveform parameters ($\Delta P_D$, $\Delta P_H$, $\ominus T$) according to the second recording standard corresponding to the manufacturer code and type code stored in the built-in register Z from the second recording standard information registered in the ROM 34 as shown in FIG. 7 and supplies the read-out waveform parameters ($\Delta P_D$, $\Delta P_H$, $\ominus T$) as a recording standard signal WS to the recording signal waveform generating circuit 12 (step S10).

That is, when one of the following three conditions a to c is satisfied, it is determined that the recording disc is the recording disc using the recording characteristics which were standardized at a time when the second recording standard has been defined. The waveform parameters ($\Delta P_D$, $\Delta P_H$, $\ominus T$) according to the second recording standard corresponding to the manufacturer code showing the manufacturer and the type code of the recording disc 17 are read out from the second recording standard information registered and stored in the ROM 34, thereby performing the setting of the recording signal waveform generating circuit 12.

a. In the case where the media type information and β category information are not recorded in the recording disc 17.

b. In the case where the dedicated disc type is not registered in the ROM 34.

c. In the case where the common disc type recorded on the recording disc 17 and the dedicated disc type read out from the ROM 34 coincide.

In step S4, when the contents in the second flag register $FR_2$ do not indicate the logic level "1", namely, when the manufacturer code and type code corresponding to the lead-in start time information on the recording disc 17 do not exist in the manufacturer code information registered in the ROM 34, the system control circuit 30 executes the next step S11. In step S11, the system control circuit 30 discriminates whether the contents in the first flag register $FR_1$ indicate the logic level "1" or not, namely, whether the media type and β category information as shown in FIG. 1 have been recorded on the recording disc 17 or not (step S11). When it is determined in step S11 that the contents in the first flag register $FR_1$ indicate the logic level "1", namely, if it is decided that the media type and β category information have been recorded on the recording disc 17, the system control circuit 30 executes step S9. If it is determined in step S11 that the contents in the first flag register $FR_1$ do not indicate the logic level "1", namely, if it is decided that the media type and β category information are not recorded on the recording disc 17, the system control circuit 30 executes the next step S12. In step S12, the system control circuit 30 reads out the waveform parameters ($\Delta P_D$, $\Delta P_H$, $\ominus T$) according to the third recording standard corresponding to the type code stored in the built-in register Z from the third recording standard information registered in the ROM 34 as shown in FIG. 8 and supplies the read-out waveform parameters ($\Delta P_D$, $\Delta P_H$, $\ominus T$) as a recording standard signal WS as mentioned above to the recording signal waveform generating circuit 12 (step S12).

That is, when the manufacturer code showing the manufacturer and the type code of the recording disc 17 are not registered in the ROM 34, the waveform parameters ($\Delta P_D$, $\Delta P_H$, $\ominus T$) according to the first recording standard corresponding to the common disc type (media type+β category) recorded on the recording disc 17 are read out from the first recording standard information registered in the ROM 34, thereby performing the setting of the recording signal waveform generating circuit 12. In this instance, if the media type and β category are not recorded on the recording disc 17, the waveform parameters ($\Delta P_D$, $\Delta P_H$, $\ominus T$) according to the third recording standard are read out from the third recording standard information registered in the ROM 34 by using the type code corresponding to the lead-in start time information of the recording disc 17, thereby performing the setting of the recording signal waveform generating circuit 12.

When one of steps S9, S10, and S12 is finished, the system control circuit 30 exits from the recording operation initial setting subroutine and returns to the execution of the main control flow.

According to the information recording/reproducing apparatus, as mentioned above, when the common disc type (media type+β category) recorded on the recording disc 17 and the dedicated disc type read out from the ROM 34 are different, the waveform of the recording signal is generated on the basis of the waveform parameters ($\Delta P_D$, $\Delta P_H$, $\ominus T$) according to the first recording standard corresponding to the common disc type recorded on the recording disc 17 (step S9).

When the common disc type and the dedicated disc type are the same, the waveform of the recording signal is generated on the basis of the waveform parameters ($\Delta P_D$, $\Delta P_H$, $\ominus T$) according to the second recording standard which has been registered for every combination of the manufacturer code and type code of the recording disc 17 (step S10).

Further, when the media type and β category information are not recorded on the recording disc 17 and the manufacturer code and type code of the recording disc 17 are not registered in the ROM 34, the waveform of the recording signal is generated on the basis of the waveform parameters ($\Delta P_D$, $\Delta P_H$, $\ominus T$) according to the third recording standard corresponding to the type code of the recording disc 17 (step S12).

As mentioned above, although there are only six kinds of first recording standard information which are read out from the ROM in correspondence to the common disc type information, the manufacturer of the disc using the lead-in start time is further finely specified. A hundred or more kinds of second recording standard information which is read out in correspondence to the finely divided manufacturers exist. Since the lead-in start time merely specifies the disc manufacturer, if the disc manufacturer changes the recording characteristics of the recording disc later, however, there is a problem such that the second recording standard information becomes improper.

According to the embodiment, by comparing the common disc type information recorded on the disc with the dedicated disc type information read out from the ROM, whether the disc manufacturer has changed the recording characteristics of the recording disc or not is discriminated. In this instance, if both disc type information do not coincide, it is determined that there is a possibility that the disc manufacturer changed the recording characteristics of the recording disc, so that the first recording standard information is selected, thereby assuring the information recording with the minimun quality required. When both disc type information coincide, it is determined that the recording disc is a disc having the same recording characteristics as those at a time when the second recording standard information has been defined, so that the second recording standard information which has been set finer for every disc type is selected, thereby performing the information recording with high precision.

The invention is not limited to the above embodiments.

For example, according to the embodiments, the manufacturer code and type code (FIG. 5) corresponding to the lead-in start time, the dedicated disc type (FIG. 6) corresponding to the manufacturer code and type code, and the waveform parameters (FIG. 7) according to the second recording standard corresponding to the manufacturer code and type code are stored in the ROM 34. It is, however, also possible to arrange the apparatus to store the common disc type corresponding to the lead-in start time and the second recording standard information in the ROM 34 and the manufacturer code and type code are not stored as intermediate data.

In the embodiment, although the second recording standard information has been read out from the ROM 34 on the basis of the lead-in start time recorded in the recording disc, the invention is not limited to this construction. In brief, it is sufficient to use a construction such that predetermined information showing the disc manufacturer or dedicated disc type is read out from the recording disc and the second recording standard information corresponding to the predetermined information is read out from the ROM 34.

Although one ROM has been used as memory means for storing each recording standard information and manufacturer code, a plurality of ROMs can be used or another memory means such as a hard disk or the like can be also used.

After confirming that the common disc type information X recorded in the recording disc and the dedicated disc type information Y read out from the ROM coincide, whether the recording disc is a recording disc having the same recording characteristics as those at a time when the second recording standard has been defined or not is discriminated. The invention, however, is not limited to this method. For example, it is also possible to record other information recorded in the recording disc, for example, a disc manufacturing day or version information and to discriminate on the basis of the information. It is also possible to arrange the apparatus so that the information is recorded by the recording signal according to the second recording standard information, the performance of a reproduction signal is checked, and for example, when a jitter value is larger than a predetermined value, it is determined that the recording disc is a disc having the different recording characteristics.

In the information recording/reproducing apparatus according to the invention as described in detail above, discrimination is first made as to whether or not the loaded recording disc is a recording disc having the recording characteristics standardized at the time when the second recording standard has been defined. If it is determined that the recording disc is a disc having the recording characteristics which are not standardized at the time when the second recording standard has been defined, the waveform of the recording signal is generated based on the first recording standard. Even if the recording characteristics of the recording disc are largely changed, the information can therefore be recorded with the necessary minimum quality without being influenced by the change in recording characteristics. If it is determined that the recording disc is a disc having the recording characteristics which have been standardized at the time when the second recording standard has been defined, the waveform of the recording signal is generated based on the second recording standard which has been set finer than the first recording standard every disc type. The information, therefore, can be recorded at very high precision.

According to the information recording/reproducing apparatus of the invention, the information can be recorded at higher precision.

What is claimed is:

1. An information recording/reproducing apparatus for recording information to a recording disc by irradiating a recording beam light to said recording disc according to a recording signal indicative of information data, comprising:
   memory means in which common disc type information to be recorded in said recording disc and a first recording standard showing waveform parameters at a time when said recording signal is generated have been stored in correspondence to each other and predetermined information to be recorded in said recording disc and a second recording standard showing waveform parameters at the time when said recording signal is generated have been stored in correspondence to each other;
   means for reading out said common disc type information and said predetermined information from said recording disc, respectively; and
   recording signal generating means for selecting one of said first recording standard and said second recording standard on the basis of said common disc type information and said predetermined information, reading out the selected standard from said memory means, and generating said recording signal on the basis of said read-out recording standard.

2. An apparatus according to claim 1, wherein said predetermined information is information indicative of a disc manufacturer.

3. An apparatus according to claim 1, wherein said predetermined information is a lead-in start time indicative of a recording start position on said recording disc.

4. An apparatus according to claim 1, wherein said common disc type information is information indicative of a disc type of said recording disc.

5. An apparatus according to claim 1, wherein said predetermined information to be recorded in said recording disc and dedicated disc type information indicative of a disc type of said recording disc have been further registered in said memory means in correspondence to each other, and said recording signal generating means reads out said dedicated disc type information corresponding to said predetermined information read out from said recording disc from said memory means, generates said recording signal on the basis of said second recording standard when both of said read-out dedicated disc type information and said common disc type information read out from said recording disc indicate the same disc type, and generates said recording signal on the basis of said first recording standard when said dedicated disc type information read out from said memory means and said common disc type information read out from said recording disc indicate different disc types.

6. An apparatus according to claim 1, wherein a manufacturer code indicative of a disc manufacturer corresponding to said predetermined information to be recorded in said recording disc has been further registered in said memory means, and said recording signal generating means generates said recording signal on the basis of said second recording standard when said manufacturer code corresponding to said predetermined information read out from said recording disc has been registered in said memory means and said common disc type information is not recorded in said recording disc.

7. An apparatus according to claim 1, wherein a manufacturer code indicative of a disc manufacturer corresponding to said predetermined information to be recorded in said recording disc and a third recording standard indicative of waveform parameters at the time when said recording signal is generated have been further stored in said memory means in correspondence to each other, and said recording signal generating means generates said recording signal on the basis of said third recording standard read out from said memory means when said manufacturer code corresponding to said predetermined information read out from said recording disc is not registered, in said memory means and said common disc type information is not recorded in said recording disc.

8. An apparatus according to claim 1, wherein a manufacturer code indicative of a disc manufacturer corresponding to said predetermined information to be recorded in said recording disc has been further registered in said memory means, and said recording signal generating means generates said recording signal on the basis of said first recording standard when said manufacturer code corresponding to said predetermined information read out from said recording disc is not registered in said memory means and said common disc type information has been recorded in said recording disc.

9. An apparatus according to claim 1, wherein a manufacturer code indicative of a disc manufacturer corresponding to said predetermined information to be recorded in said recording disc has been further registered in said memory means and said predetermined information to be recorded in said recording disc and dedicated disc type information indicative of a disc type of said recording disc have been further registered in said memory means in correspondence to each other, and said recording signal generating means generates said recording signal on the basis of said second recording standard in the case where said common disc type information has been recorded in said recording disc and said dedicated disc type information corresponding to said predetermined information read out from said recording disc is not registered in said memory means and said manufacturer code corresponding to said predetermined information has been registered in said memory means.

10. An information recording/reproducing apparatus for recording information to a recording disc by irradiating a recording beam light to said recording disc according to a recording signal indicative of information data, comprising:

memory means in which common disc type information to be recorded in said recording disc and a first recording standard showing waveform parameters at a time when said recording signal is generated have been stored in correspondence to each other and dedicated disc type information of each disc manufacturer and a second recording standard showing waveform parameters at the time when said recording signal is generated have been stored in correspondence to each other;

means for reading out said common disc type information from said recording disc;

detecting means for detecting the disc manufacturer of said recording disc; and recording signal generating means for selecting one of said first recording standard and said second recording standard on the basis of said dedicated disc type information corresponding to said disc manufacturer read out from said memory means and said common disc type information read out from said recording disc, reading out the selected standard from said memory means, and generating said recording signal on the basis of said read-out recording standard.

11. An apparatus according to claim 10, wherein said recording signal generating means generates said recording signal on the basis of said second recording standard when both of said dedicated disc type information and said common disc type information indicate the same disc type, and said recording signal generating means generates said recording signal on the basis of said first recording standard when both of said information indicate different disc types.

12. An information recording method for recording information to a recording disc by irradiating a recording beam light to said recording disc according to a recording signal indicative of information data, said method comprising the steps of:

storing common disc type information to be recorded in said recording disc and a first recording standard showing waveform parameters at a time when said recording signal is generated into memory means in correspondence to each other and further storing predetermined information to be recorded in said recording disc and a second recording standard showing waveform parameters at the time when said recording signal is generated into said memory means in correspondence to each other, respectively; and selecting one of said first recording standard and said second recording standard on the basis of said common disc type information read out from said recording disc and said predetermined information, reading out the selected standard from said memory means, and generating said recording signal on the basis of said read-out recording standard.

13. A method according to claim 12, wherein said predetermined information to be recorded in said recording disc and dedicated disc type information indicative of a disc type of said recording disc have been further registered in said memory means in correspondence to each other, said dedicated disc type information corresponding to said predetermined information read out from said recording disc is read out from said memory means, when both of said read-out dedicated disc type information and said common disc type information read out from said recording disc indicate the same disc type, said recording signal is generated on the basis of said second recording standard, and when said dedicated disc type information read out from said memory means and said common disc type information read out from said recording disc indicate different disc types, said recording signal is generated on the basis of said first recording standard.

14. An information recording method of recording information to a recording disc by irradiating a recording beam light to said recording disc according to a recording signal indicative of information data, comprising the steps of:

storing common disc type information to be recorded in said recording disc and a first recording standard showing waveform parameters at a time when said recording signal is generated into memory means in correspondence to each other and further storing dedicated disc type information of each disc manufacturer and a second recording standard showing waveform parameters at the time when said recording signal is generated into said memory means in correspondence to each other, respectively; and selecting one of said first recording standard and said second recording standard on the basis of said dedicated disc type information corresponding to the disc manufacturer of said recording disc read out from said memory means and said common disc type information read out from said recording disc, reading out the selected standard from said memory means, and generating said recording signal on the basis of said read-out recording standard.

15. A method according to claim 14, wherein said second recording standard is selected when both of said dedicated disc type information corresponding to said disc manufacturer and said common disc type information read out from said recording disc indicate the same disc type, and said first recording standard is selected in the case where both of said information indicate different disc types.

* * * * *